United States Patent
Mowatt et al.

(10) Patent No.: US 12,242,864 B2
(45) Date of Patent: Mar. 4, 2025

(54) FILE OPENING OPTIMIZATION

(71) Applicant: Microsoft Technology Licensing, LLC, Redmond, WA (US)

(72) Inventors: David Mowatt, Dublin (IE); Miriam Kathryn Daniel, Bothell, WA (US); Grace Rosemary O'Barr Culver, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 17/849,200

(22) Filed: Jun. 24, 2022

(65) Prior Publication Data

US 2023/0418624 A1    Dec. 28, 2023

(51) Int. Cl.
G06F 9/445    (2018.01)
G06F 8/61     (2018.01)
G06F 16/17    (2019.01)

(52) U.S. Cl.
CPC .............. G06F 9/4451 (2013.01); G06F 8/61 (2013.01); G06F 16/1734 (2019.01)

(58) Field of Classification Search
CPC ....... G06F 9/4451; G06F 16/1734; G06F 8/61
USPC .......................................................... 713/2
See application file for complete search history.

(56) References Cited

U.S. PATENT DOCUMENTS

| | | | | |
|---|---|---|---|---|
| 5,440,745 A * | 8/1995 | Platte | .................... | G06F 40/103 718/101 |
| 6,047,312 A * | 4/2000 | Brooks | ................. | G06F 21/604 709/215 |
| 6,351,647 B1 * | 2/2002 | Gustafsson | ........... | H04W 4/029 455/414.3 |
| 7,191,436 B1 * | 3/2007 | Durr | ........................ | G06F 8/65 707/999.005 |
| 7,409,405 B1 * | 8/2008 | Masinter | ................. | G06F 9/445 707/999.102 |
| 7,788,588 B2 * | 8/2010 | McKee | ............... | G06F 9/44505 715/741 |
| 8,204,897 B1 * | 6/2012 | Djabarov | ............ | G06F 16/9538 707/767 |
| 8,386,955 B1 * | 2/2013 | Weber | ................. | G06F 16/9562 715/838 |
| 9,280,553 B2 * | 3/2016 | Saliba | ................. | G06F 21/6218 |
| 10,467,648 B1 * | 11/2019 | Walker | ................. | G06Q 20/387 |
| 10,841,403 B2 | 11/2020 | Tyebkhan et al. | | |

(Continued)

OTHER PUBLICATIONS

International Search Report and Written Opinion received for PCT Application No. PCT/US23/021628 mailed on Aug. 4, 2023, 14 pages.

*Primary Examiner* — Paul R. Myers
(74) *Attorney, Agent, or Firm* — NovoTechIP International PLLC

(57) ABSTRACT

Systems and methods for opening files on a client device include receiving a request to open a file and identifying a file type pertaining to the file. A list of software applications is identified that are capable of opening the identified file type, and metadata pertaining to each of the software applications on the list is retrieved. User preference data pertaining to a user requesting to open the file is also retrieved. Scores for the software applications on the list are then determined based at least on the metadata and the user preference data. At least one software application on the list is then selected to open the file on the client device based on the determined scores.

16 Claims, 12 Drawing Sheets

(56) References Cited

U.S. PATENT DOCUMENTS

| | | | |
|---|---|---|---|
| 2001/0040571 A1* | 11/2001 | Miller | G06T 15/10 |
| | | | 345/419 |
| 2002/0010717 A1* | 1/2002 | Breuer | G06F 40/103 |
| | | | 715/239 |
| 2004/0122785 A1* | 6/2004 | Brown | G06N 3/105 |
| | | | 717/140 |
| 2007/0150369 A1* | 6/2007 | Zivin | G06Q 30/0631 |
| | | | 705/26.7 |
| 2007/0240098 A1* | 10/2007 | Averett | G06F 9/44505 |
| | | | 717/174 |
| 2007/0297029 A1* | 12/2007 | Low | G06F 40/106 |
| | | | 358/527 |
| 2012/0042036 A1* | 2/2012 | Lau | G06F 8/61 |
| | | | 709/217 |
| 2012/0149408 A1* | 6/2012 | Steer | H04W 72/044 |
| | | | 455/466 |
| 2012/0252480 A1* | 10/2012 | Krutt | H04W 4/80 |
| | | | 455/41.1 |
| 2012/0311710 A1* | 12/2012 | Butler | H04L 63/145 |
| | | | 726/24 |
| 2013/0111336 A1* | 5/2013 | Dorman | G06F 9/4843 |
| | | | 715/255 |
| 2013/0282755 A1* | 10/2013 | Procopio | G06F 16/148 |
| | | | 707/E17.014 |
| 2014/0245203 A1* | 8/2014 | Lee | G06F 3/04845 |
| | | | 715/765 |
| 2014/0344247 A1* | 11/2014 | Procopio | G06F 16/248 |
| | | | 707/722 |
| 2014/0365970 A1* | 12/2014 | Jeong | G06F 3/04817 |
| | | | 715/835 |
| 2015/0095321 A1* | 4/2015 | Procopio | G06F 8/61 |
| | | | 707/723 |
| 2015/0095322 A1* | 4/2015 | Procopio | G06Q 30/0631 |
| | | | 707/723 |
| 2015/0199196 A1* | 7/2015 | Cairns | G06F 9/44505 |
| | | | 717/120 |
| 2015/0365469 A1* | 12/2015 | Procopio | H04L 67/10 |
| | | | 709/217 |
| 2016/0127452 A1* | 5/2016 | Newman | G06F 16/178 |
| | | | 709/203 |
| 2020/0053175 A1* | 2/2020 | Bodman | H04L 67/01 |
| 2020/0099783 A1* | 3/2020 | Liu | G06N 3/08 |
| 2021/0103447 A1* | 4/2021 | Wei | G06F 3/0481 |
| 2021/0326143 A1 | 10/2021 | Qiao | |
| 2022/0171610 A1* | 6/2022 | Cataniag | G06F 8/445 |
| 2022/0405612 A1* | 12/2022 | Kleiner | G06N 5/04 |

* cited by examiner

FILE OPENING OPTIMIZATION

BACKGROUND

When a user selects a file to open via a user device, the user device (for example, the operating system) determines a software application to use to open and process the file. For example, when the file is a spreadsheet file, the user device may identify a locally-installed software application configured to open and process this file type. Similarly, when the file is a word processing file, the user device identifies a locally-installed software application configured to open and process this file type. In some embodiments, the user device uses a file extension of the file to determine a file type and compares the determined file type to stored mappings representing software applications configured to open and process such file types. For example, a ".pdf" file extension designates portable document format files, which may be associated with Acrobat Reader® provided by Adobe Systems, Inc., a ".ppt" file extension designates presentation files, which may be associated with PowerPoint® provided by Microsoft Corporation, and a ".doc" or ".docx" file extension designates word processing files, which may be associated with Word® provided by Microsoft Corporation.

In some situations, the user device may not identify any locally-installed applications that are configured to open files of the requested file type. When this occurs, the user device may prompt the user to select an application from a list of available applications, which may include applications locally installed on the user device as well as applications available for download to the user device. In many cases, a user may not have experience with any of the applications offered to open the file type and therefore may not know which application to select to best fulfil the needs of the user. In addition, once the user has selected an application to open a file of a certain type, that application may be designated as the default application to open files of that type by the operating system moving forward. As a result, the user may be locked in to using that application and may not have the knowledge to change the default application for opening that file type.

What is needed are improved methods for opening files that facilitates the opening of files using applications that better suit a user's needs and/or preferences and that may be more efficient at processing the files.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a request to open a file on a user device; identifying a file type pertaining to the file; identifying a list of software applications capable of opening the identified file type; retrieving one or more of metadata pertaining to each of the software applications on the list, user preference data pertaining to a user requesting to open the file, and organizational preference data pertaining to at least one organization with which the user is affiliated; determining scores for the software applications on the list based on the one or more of the metadata, the user preference data, and the organizational preference data; and selecting at least one software application on the list to open the file on the user device based on the determined scores.

In yet another general aspect, the instant disclosure presents a method of opening a file on a client device that includes receiving a request to open a file on a user device; identifying a file type pertaining to the file; identifying a list of software applications capable of opening the identified file type; retrieving one or more of metadata pertaining to each of the software applications on the list, user preference data pertaining to a user requesting to open the file, and organizational preference data pertaining to at least one organization the user is affiliated with; determining scores for the software applications on the list based on the one or more of the metadata, the user preference data, and the organizational preference data; and selecting at least one software application on the list to open the file based on the determined scores.

In a further general aspect, the instant application describes a non-transitory computer readable medium on which are stored instructions that when executed cause a programmable device to perform functions of receiving a request to open a file on a user device; identifying a file type pertaining to the file; identifying a list of software applications capable of opening the identified file type; retrieving one or more of metadata pertaining to each of the software applications on the list, user preference data pertaining to a user requesting to open the file, and organizational preference data pertaining to at least one organization with which the user is affiliated; determining scores for the software applications on the list based on the one or more of the metadata, the user preference data, and the organizational preference data; and selecting at least one software application on the list to open the file based on the determined scores.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As note above, when a user device does not include a default application to open a particular type of file, previously known file opening systems would prompt the user to select an application from a list of available applications, which may include applications locally installed on the user device as well as applications available for download to the user device. However, the user may not have experience with any of the applications offered to open the file type and therefore may not know which application to select will best fulfil the needs of the user.

To address these technical problems and more, in an example, this description provides technical solutions in the form of a file opening system that is configured to utilize application metadata and user preference data to identify default applications for opening files on a user device. In some embodiments, default applications may be selected automatically based on the metadata and preference data. In other embodiments, metadata and user preference data may be used to filter available software applications to identify candidate applications from which a user may select a default application for opening a particular file type.

Figure 1:
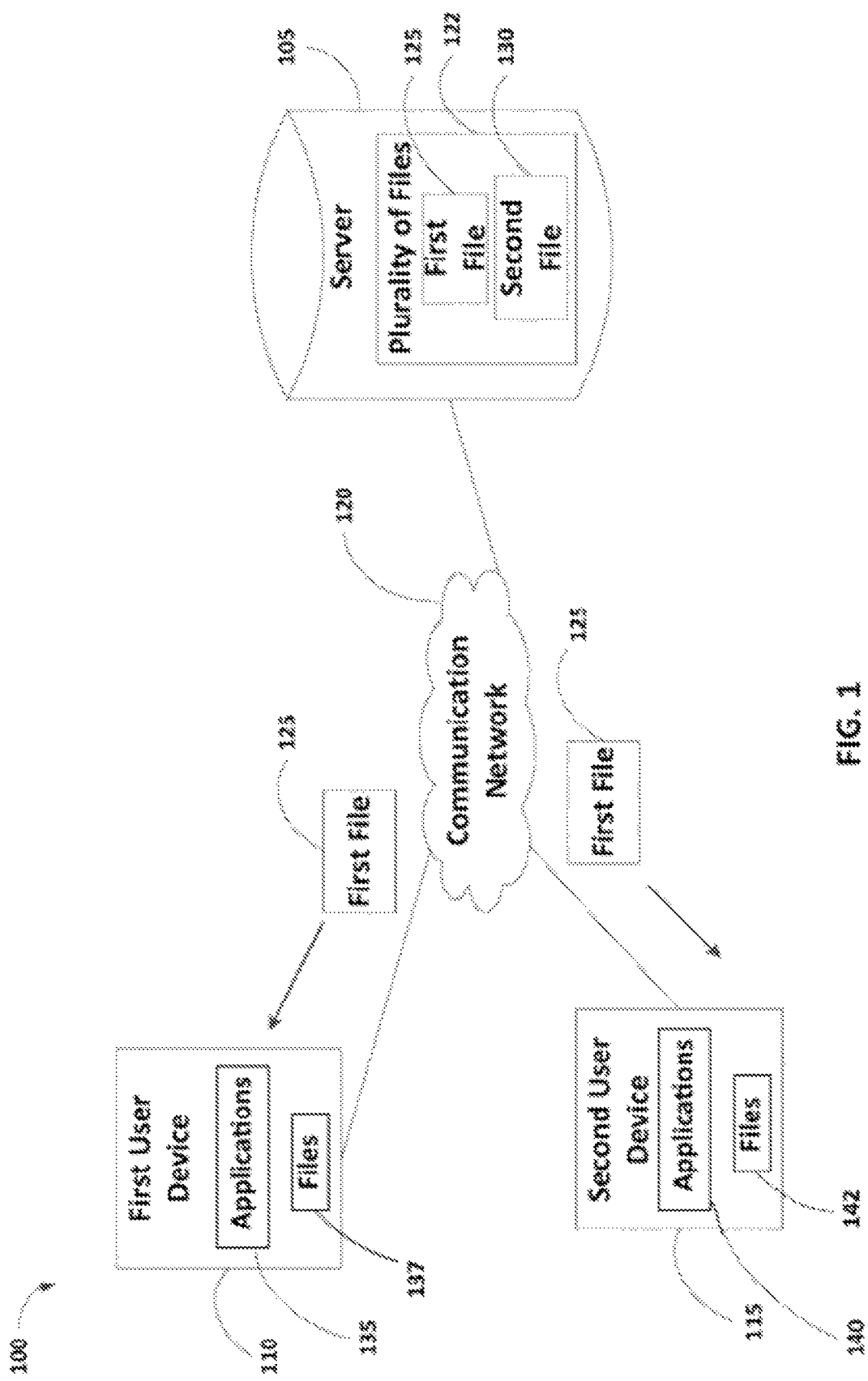
FIG. 1 shows an example system upon which aspects of this disclosure may be implemented.

FIG. 1 schematically illustrates a system 100 for opening a file. The system 100 may be, for example, a cloud-based storage or computing environment. The system 100 includes one or more servers (such as a server 105) and one or more user devices (such as a user device 110 and a user device 115). The servers 105 and the user devices 110 and 115 communicate over one or more wired or wireless communication networks 120. Portions of the wireless communication networks 120 may be implemented using a wide area network, such as the Internet, a local area network, such as a Bluetooth™ network or Wi-Fi, and combinations or derivatives thereof. It should be understood that each server included in the system 100 may communicate with any number of user devices, and the two user devices 110 and 115 illustrated in FIG. 1 are purely for illustrative purposes. Similarly, it should also be understood that the system 100 may include any number of servers and the single server 105 illustrated in FIG. 1 is purely for illustrative purposes. Also, in some embodiments, one of the user devices 110, 115 may communicate with the server 105 through one or more intermediary devices (not shown).

As described below, the server 105 stores a plurality of files 122 (such as a first file 125 and a second file 130) accessible via the user devices 110 and 115. As illustrated in FIG. 1, the server 105 may transfer a file to a user device via the communication network 120 when the server 105 receives a request for the file from the user devices (and in some cases proper credentials for accessing the file) or as part of a periodic synchronization between files stored on the server 105 and files stored on the user devices. In some embodiments, the server 105 also initially receives a file from a user device for storage purposes. For example, as noted above, the server 105 may provide a cloud-storage environment where users may upload or synchronize files locally stored on a user device with the cloud-storage environment and, thus, may subsequently access the uploaded files from the cloud-storage environment from the same or a different user device.

Figure 2:
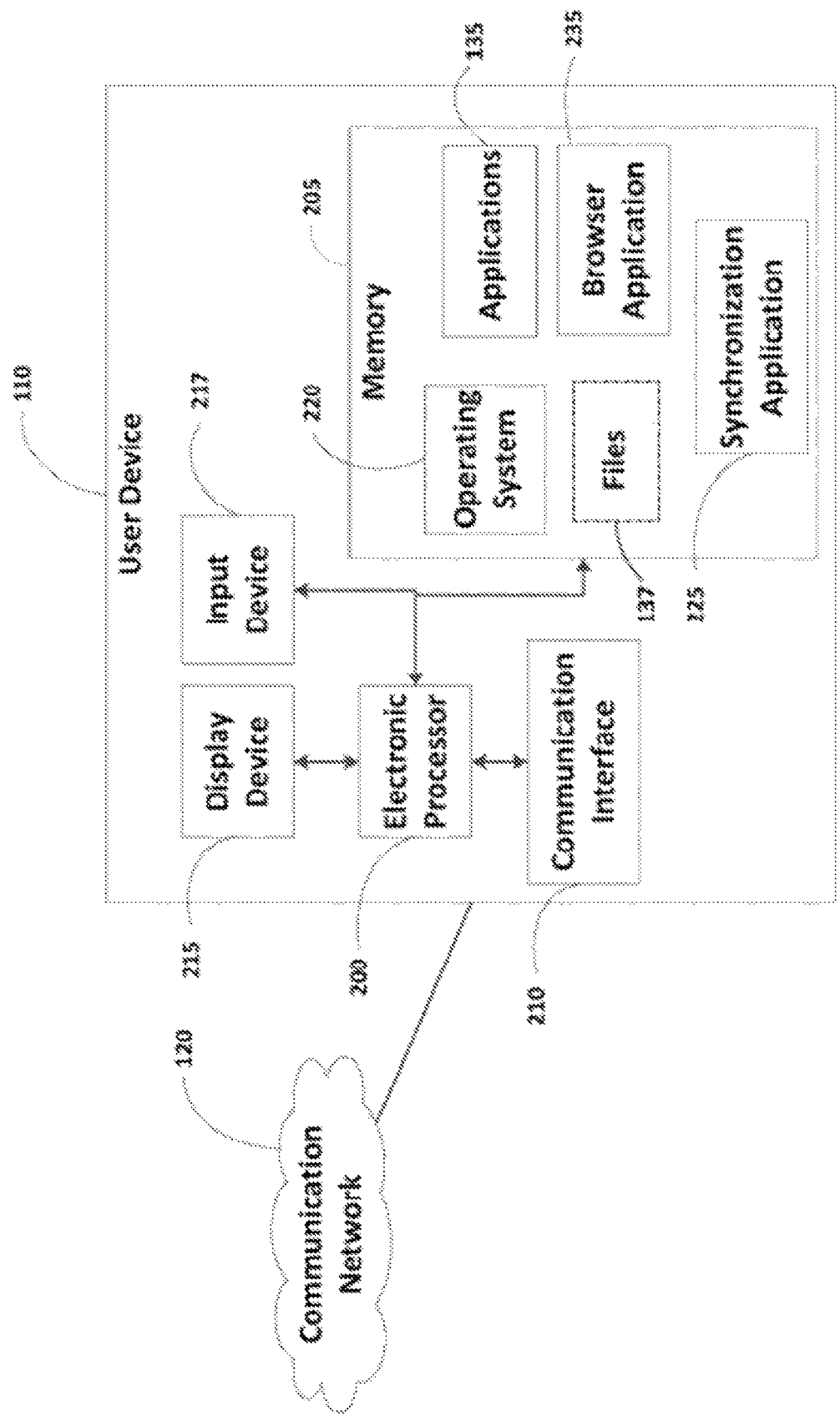
FIG. 2 shows a user device included in the system of FIG. 1.

Each of the user devices 110 and 115 is used by a user or tenant of the system 100, and each user device 110, 115 includes an electronic device, such as a smart phone, a smart watch, a tablet computer, a laptop computer, mixed reality headsets, or the like. For example, as illustrated in FIG. 2, the user device 110 includes an electronic processor 200 (for example, a microprocessor, application-specific integrated circuit (ASIC), or another suitable electronic device), a memory 205 (for example, a non-transitory, computer-readable storage medium), and a communication interface 210 such as a transceiver, for communicating over the communication network 120 and, optionally, one or more additional communication networks or connections. User devices 110, 115 each include files 137, 142 which may be any of a variety of different types of files. User devices 110, 115 also include applications 135, 140 which may enable the user devices to open files of one or more types on the user device.

FIG. 2 shows an example implementation of the user device 110. It is to be understood that the user device 115 may have a similar configuration as user device 110 shown in FIG. 2. As illustrated in FIG. 2, the user device 110 also includes a display device 215 and an input device 217. The display device 215 may be, for example, a touchscreen, a liquid crystal display ("LCD"), a light-emitting diode ("LED") display, an organic LED ("OLED") display, an electroluminescent display ("ELD"), and the like. The input device 217 may be, for example, a keypad, a mouse, a touchscreen (for example, as part of the display device 215), a microphone, a camera, or the like. The electronic processor 200, the memory 205, the communication interface 210, the display device 215, and the input device 217 communicate wirelessly, over one or more communication lines or buses, or a combination thereof. It should be understood that the user device 110 may include additional components than those illustrated in FIG. 2 in various configurations and may perform additional functionality than the functionality described in the present application. Also, it should be understood that, although not described or illustrated herein, the user device 115 may include similar components and perform similar functionality as the user device 110.

As illustrated in FIG. 2, the memory 205 of the user device 110 includes an operating system 220, a synchronization application 225, applications 135 configured to open files of one or more file types, and a browser application 235. Files opened by applications 135 may include files stored on a server, such as the first file 123 or second file 130 on server 105 shown in FIG. 1, or may include files 137 stored locally in the memory 220 of the user device 110. Files 137 may be synchronized to the server 105 or may be stored exclusively on the user device (e.g., without synchronization). Also, in some embodiments, the functionality described herein as being provided by the operating system 220, the synchronization application 225, and the applications 135 may be distributed and combined in various configurations. For example, the functionality provided by the synchronization application 225 may be divided among multiple different applications or the functionality provided by the synchronization application 225 (or a portion thereof) may be performed by the applications 135, the operating system 220, or a combination thereof.

The synchronization application 225 (when executed by the electronic processor 200) is configured to manage the uploading and downloading of files to the cloud-storage environment provided through the server 105. For example, the synchronization application 225 may provide a user interface that allows a user to specify what locally-stored files 137 should be uploaded to the cloud-storage environment and other synchronization parameters, such as how frequently to perform synchronizations, when to synchronize files stored within the cloud-storage environment with locally-stored files, and the like. In some embodiments, when a user selects a file to open on the user device 110 or 115, the synchronization application 225 also automatically downloads a most recent version of the selected file from the cloud-storage environment to the user device 110 or 115. Similarly, as a user makes and commits changes to a locally-stored file, the synchronization application 225 automatically applies similar updates to the version of the file stored within the cloud storage environment.

As noted above, applications 135 (when executed by the electronic processor 200) may be configured to open files of one or more file types. For example, one of the applications 135 may be Word® provided by Microsoft Corporation, which is configured to open word processing files, such as files with the file extension ".doc" or ".docx." Each of the applications 135 is also associated with a version. For example, when the application 135 is Word®, the application 135 may be a 98 version, a 2003 version, a 2010 version, or the like. It should be understood that the version of an application may be specified in terms of a year, a sequential number (for example, version 2.0), a build, update, or installation number, a unique name, or the like. The operating system 220 maintains a list of installed applications and a mapping that designates what file types each installed application is configured to open and may also store a version of each currently-installed application.

The browser application 235 (as executed by the electronic processor 200) allows the user device 110 or 115 to access a web page, including web-based applications. In some embodiments, the browser application 235 is configured as a generic browser application configured to access any web page accessible over a communication network, such as the Internet. For example, the browser application 235 may include Internet Explorer® provided by Microsoft Corporation, Safari® provided by Apple, Inc., Chrome® provided by Google LLC, or Firefox® provided by Mozilla Corporation. However, in other embodiments, the browser application 235 may be configured as a dedicated-purposes browser application configured to access a specific web page or specific web-based application.

Figure 3:
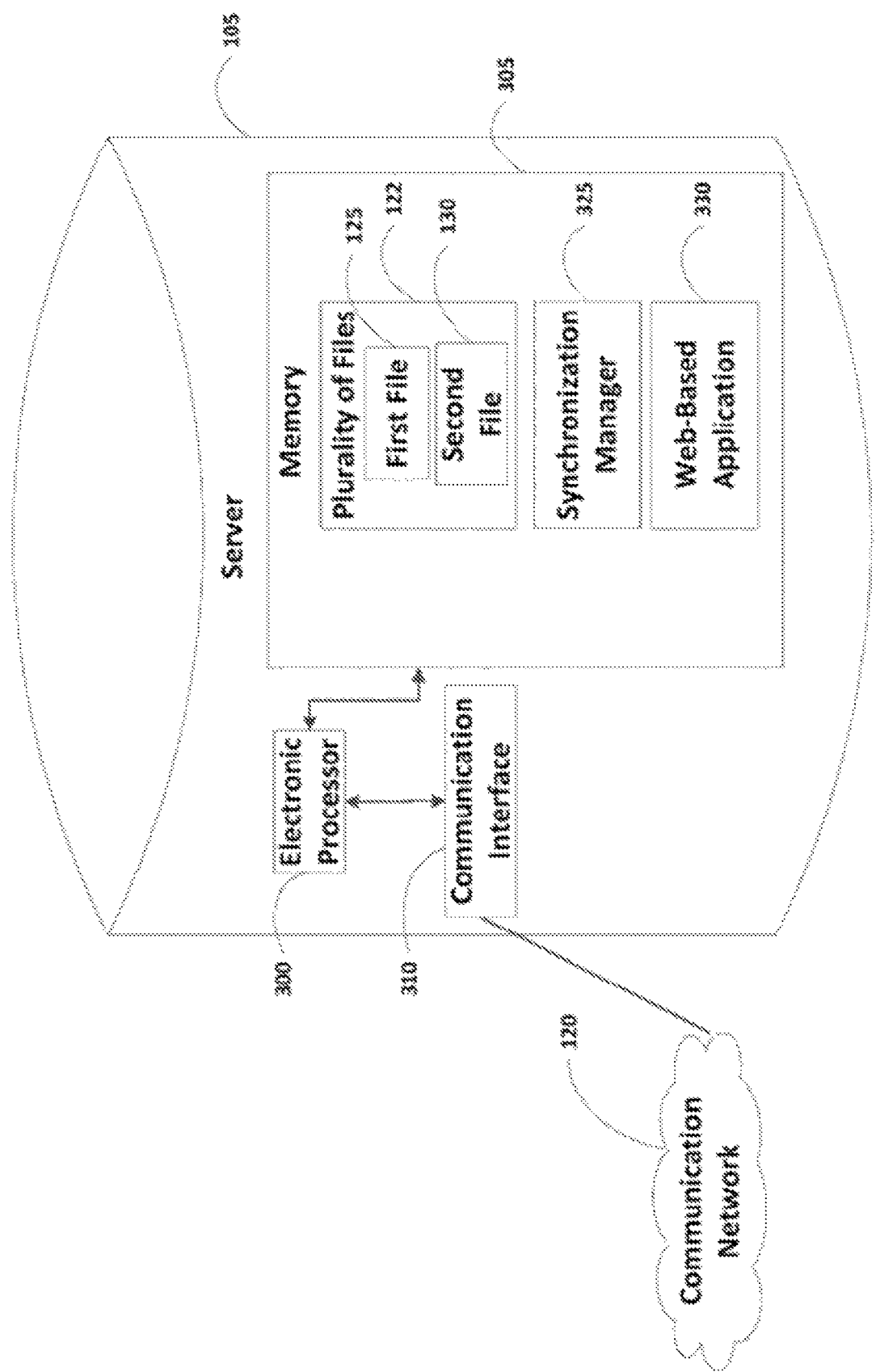
FIG. 3 shows a server for servicing user devices included in the system of FIG. 1.

As illustrated in FIG. 3, the server 105 stores (in the memory 305) a plurality of files 122 (including the first file 125 and the second file 130), and a synchronization manager 325. It should be understood that the memory 305 included in the server 105 may store additional applications and data, and the data and applications stored in the memory 305 may be stored on multiple memory devices or modules and may be configured and distributed in various configurations. For example, in some embodiments, the memory 305 also stores a web-based application 330, which may be a web-based adaptation of one of the applications 135. Also, in some embodiments, the functionality described herein as being provided by the synchronization manager 325 or the web-based application 330 may be distributed and combined in various configurations. For example, the functionality provided by the synchronization manager 325 may be divided among multiple different applications or the functionality provided by the synchronization manager 325 (or a portion thereof) may be performed by the web-based application 330.

The synchronization manager 325 may communicate with the synchronization application 225 installed on the user devices 110 and 115 to manage the uploading of files from the user devices 110 and 115 and the downloading of files to the user devices 110 and 115, including the synchronization of files stored on a user device and stored within the cloud-based storage environment. Similarly, the user devices 110 and 115 can access the web-based application 330 using the browser application 235 as described above. For example, if a user wants to open a file stored within the cloud-based storage environment within the web-based application 330, the user uses the browser application 235 to access the web-based application 330 and select the requested file currently stored in the cloud-based storage environment.

As described above, when the user is not working within the web-based application 330 and requests access to a file stored within the cloud-based storage environment, the synchronization application 225 installed on the user device 110 or 115 communicates with the synchronization manager 325 installed on the server 105 to download a copy of the requested file to the user device 110 or 115 (the memory 205).

The files stored, downloaded, and/or synchronized on a user device may be any of a variety of different types of files, e.g., text files, word processing files, spreadsheet files, image files, video files, etc. In previously known systems, when a user attempted to open a file on the client device (e.g., by clicking on the file), the operating system of the client device would determine whether an application had been previously designated as the default application for opening that type of file. If the user attempted to open a file for which a default application had not been designated, the operating system would typically present the user with a list of applications capable of opening the file and required the user to select one of the applications to open the file. However, the user may not be familiar with the software applications offered to open the file. As a result, the user may end up selecting an application that does not fulfil the needs of the user with regard to that type of file. Furthermore, even if a default application had been previously designated, the user may not be aware of other applications for opening the file that may be better suited to their needs or that may be more effective and/or error-free at processing their files.

Figure 4A:
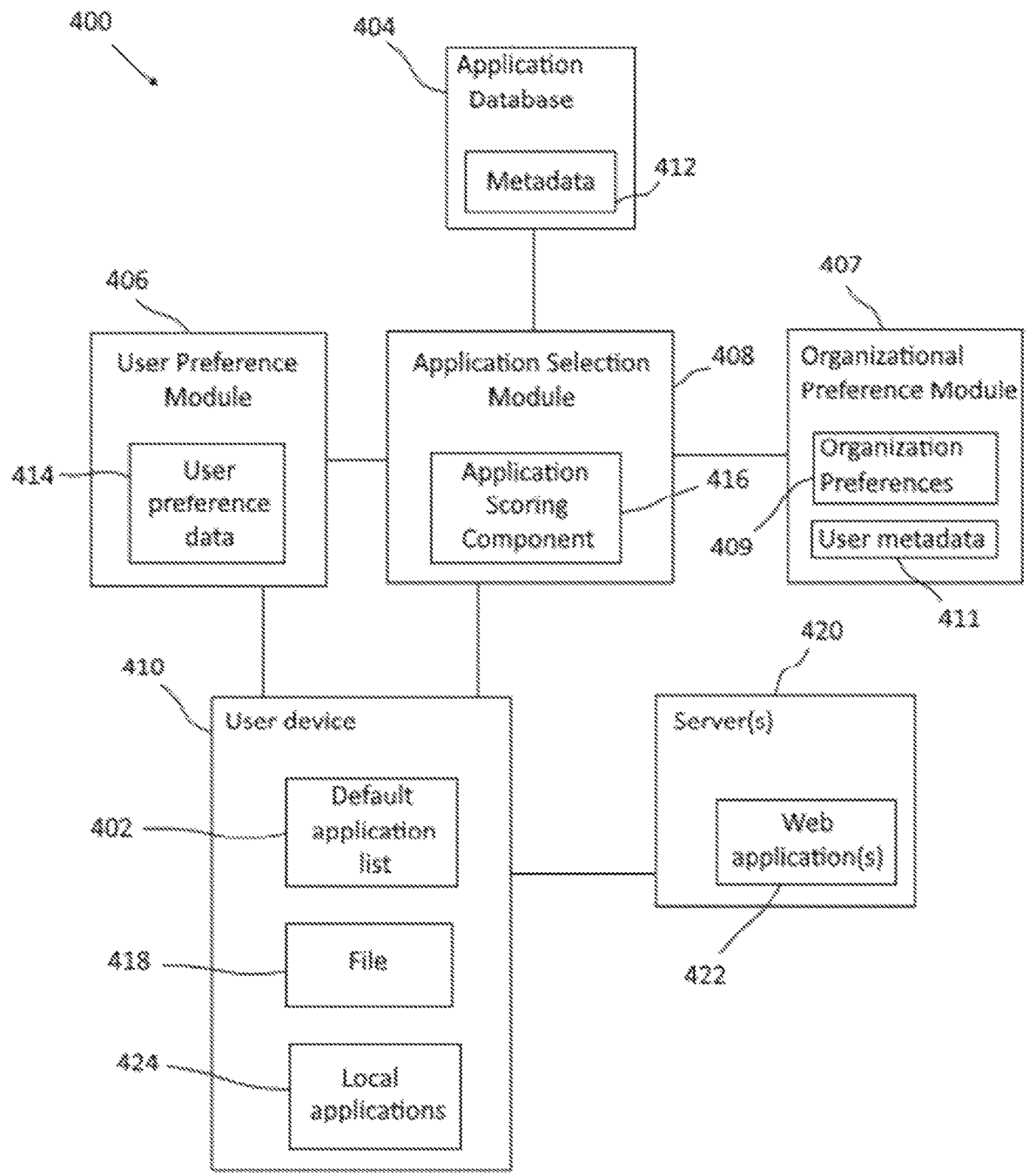
FIG. 4A shows an example of a file opening system for opening files on a user device in accordance with this disclosure.

To solve these technical problems and more, the present disclosure presents a file opening system that facilitates the opening of files using applications which may be better suited to the needs and/or desires of the user. An implementation of a file opening system 400 in accordance with this disclosure is shown in FIG. 4A. The file opening system 400 includes a default application list 402, an application database 404, a user preference module 406, an organizational preference module 407, and an application selection module 408. The default application list 402 includes a list of file types for which default applications have been designated on the user device 410 as well as the application which has been designated as the default application for each file type. In the embodiment of FIG. 4A, the default application list 402 is stored on the user device 410. In other embodiments, the default application list 410 may be stored remotely, such as in a cloud storage system, which may be accessed via a network (not shown).

The application database 404 includes information pertaining to software applications for opening files of various file types. For example, the application database 404 may comprise one or more application stores, application review sites, and/or the like. Application database 404 may be accessed to determine a list of applications which are capable of opening files of a given type. The applications listed in the applications database 404 may include software applications 424 which are installed locally on the user device, web-based applications 422 which are provided on one or more servers 420, and other applications which may be installed and/or accessed by the user device 410. The application database 404 may also include metadata 412 pertaining to each application in the database. The metadata 412 may include application metadata, such as features, capabilities, license type (e.g., free, open source, paid), platform (e.g., Windows(r), Mac, Linux, Android), date of last update, and the like. The metadata 412 may also include usage metadata, such as number of downloads, customer ratings, popularity, comments, and the like. Metadata may also include action metadata indicating the actions that are supported by applications, such as opening, signing, compressing, viewing, editing, encrypting, and the like.

Application metadata may also include the user's licensing state with respect to an application. If the user has paid for a license or subscription to a software application or application suite, these applications would likely be preferred by a user. The system therefore is configured to determine whether a user has a license, product key, subscription, etc. for software applications. This information may then be used as a factor in determining whether to recommend a software application to the user when opening a file. Application metadata may also include information indicating whether an application is locally-installed on the user device. The service may be configured to recommend an application that is already installed on the user device as it will load instantaneously, rather than needing to be downloaded which could take seconds/minutes. This data may be located on the device, synchronized to a cloud service or passed as an input parameter from the client to the service at the time that the user goes to open the file.

The user preference module 406 is configured to determine user preference data 414 pertaining to a user's usage of software applications on the user device 410 or other device. In embodiments, user preference data may be stored online, e.g., as part of a cloud service, such that the user preference data may be updated as the user interacts with various software applications on various devices over time.

Figure 4B:
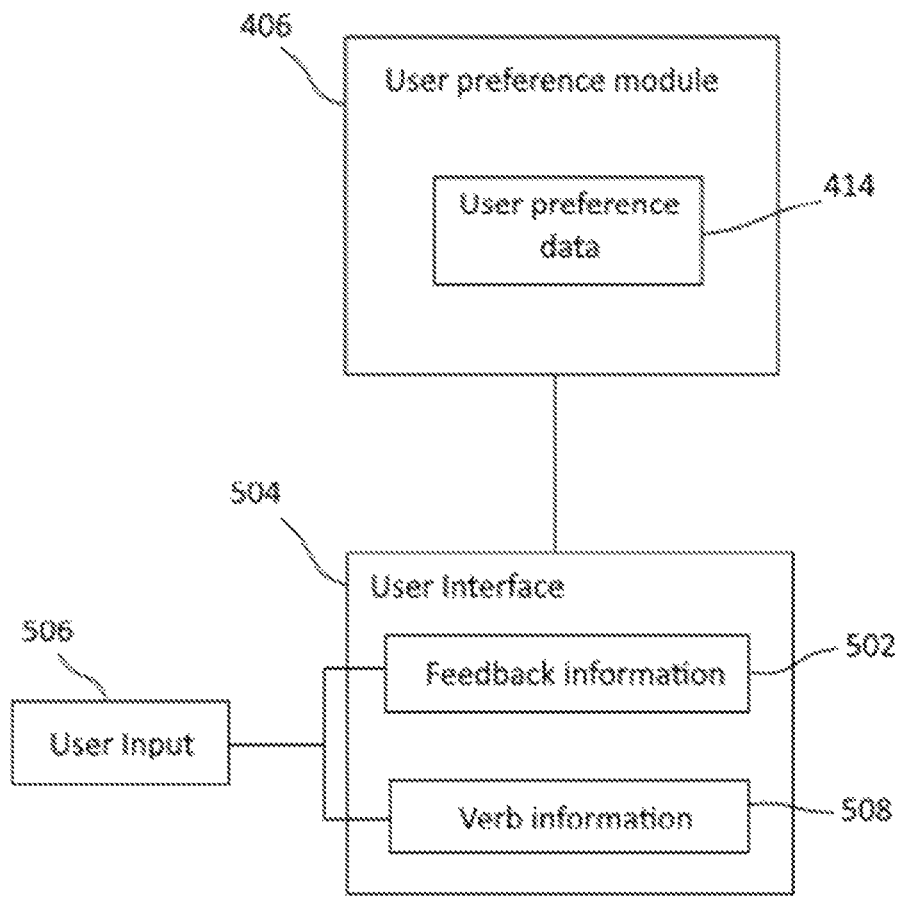
FIG. 4B shows the user preference module of FIG. 4A in greater detail.

The user preference data 414 may be explicit and/or implicit. As shown in FIG. 4B, the user preference module 406 may be configured to determine user preference data 414 explicitly by requesting feedback information 502 from a user via a user interface 504 of the client device and to receive user input 506 including information pertaining to the feedback information. Examples of feedback questions that may be presented to a user include preferred types of applications (e.g., freeware, open source, proprietary, applications having free trial periods, etc.), preferred operations (e.g., viewing vs. editing), desired features of applications, and the like. User preference module 406 may also be configured to request user feedback in the form of ratings for application, which may be in the form of a selectable "thumbs up" or "thumbs down", rating on a scale, such as stars (e.g., 1 to 5 stars) or numbers (e.g., number from 1 to 5), and the like. The user's answers to the feedback questions may then be stored as user preference data 414 for the user. The user preference module 406 may be configured to determine user preference data implicitly by monitoring the user's interaction with software applications on the user device 410, such as software applications used, the length of time interacting with applications, the types of operations performed, and the like. Parameters indicative of the user's interactions with software applications may then be stored as user preference data 414 for the user.

In embodiments, user preference module 406 may be configured to request and receive user input regarding the user's context for opening the file. The user's context includes the actions that the user would like to perform with a file and/or the actions that the user would desire for the application to perform, such as opening, viewing, editing, compressing, encrypting, signing, and the like. This concept is referred to herein as the "verb(s)" associated with opening the file. Referring to FIG. 4B, the user preference module 406 may be configured to request verb information 506 from the user via the user interface 504 and to receive user input 504 identifying one or more verbs indicating actions the user would desire the application to be able to perform with a file.

User preference module 406 may also be configured to receive input parameters defining applications, or versions of applications, which should not be utilized. For example, the system may be configured to determine based on application performance, e.g., success in loading a file, loading times, etc., that an application is likely not to be preferred and/or desired to be utilized by a user. The system may also be configured to receive input from a user identifying applications which the user does not want to utilize (e.g., a black list). The applications designated not to use may then be removed from the list (or not added to the list) of applications selected for further processing, e.g., scoring, by the system. The verb information provided by the user may also be helpful in this regard. For example, a user may specify the desire to open a file whereas some applications may perform actions, such as sign, compress, encrypt, etc., without opening the file. These applications may therefore be excluded based on the verb information provided by the user.

Referring again to FIG. 4A, the organizational preference module 407 is configured to provide organizational preference information 409 to the application selection module 408. For example, a user may be affiliated with one or more organizations, including employment organization(s), customer organization(s), hobby group(s), and like, which may have preferences and/or requirements regarding the type, source, brand, etc. of applications that the user should use in processing files. The organization preference information 409 may identify the preferred and/or required application(s) defined by the one or more organizations of the user. The organizational preference module 407 may also be configured to determine application preferences of other users in the organization and use this information to help identify applications for opening files for the user. For example, the organizational preference module 407 may be configured to know and/or determine which applications are utilized by other users in an organization as well as the number of users of each application in the organization. In embodiments, the organizational preference information may be provided to the system by the organization(s) (e.g., by an IT administrator of an organization).

The organizational preference module 407 may also include user metadata 411 which may be used to further define the application(s) that an organization may prefer/require that a user utilize in processing files. The user metadata 411 includes information which identifies one or more parameters indicative of the user's relationship with one or more organizations with which the user is affiliated, such as job title, role, geographic location, and the like. An organization may have different application preferences/requirements for different jobs within an organization. A user having a technical position, such as a developer or engineer, may have the need/requirement to use an application having advanced editing capabilities to process a file while a user having a support position, such as human resources, may only require the ability to view a file. Similarly, organizations may have different application preferences/requirements for user's based on the geographic location of the user. When a user attempts to open a file 418 on the user device 410 (e.g., by clicking on the file via the user interface of the user device), the file opening system 400 is configured to access the application database 404 to retrieve a list of software applications which are capable of opening files of that type as well as the metadata pertaining to each of the software applications. For example, an operating system of the user device 410 may be configured to send a request to open a file to the application selection module 408 that includes the file type of the file 418 to be opened. The application selection module 408 is configured to select one or more applications for opening the file based on the file type. The selection may be based at least in part on one or more of the application metadata 412, user preference data 414, feedback information 502, verb information 508, organization preferences 409, and user metadata 411. To facilitate the selection of the one or more applications for opening the file based on this information, the application selection module 408 includes an application scoring component 416 that is configured to generate a score for each application based at least in part on the metadata 412 pertaining to the software applications and the user preference data 414 pertaining to the user requesting to open the file. The application selection module 408 is configured to select one or more applications for opening the file 418 based on the application scores. In embodiments, the application scoring component 416 may be configured to give higher scores to applications that are more likely to be preferred by a user based on one or more of the application metadata 412, user preference data 414, feedback information 502, verb information 508, organization preferences 409, and user metadata 411.

Figure 4C:
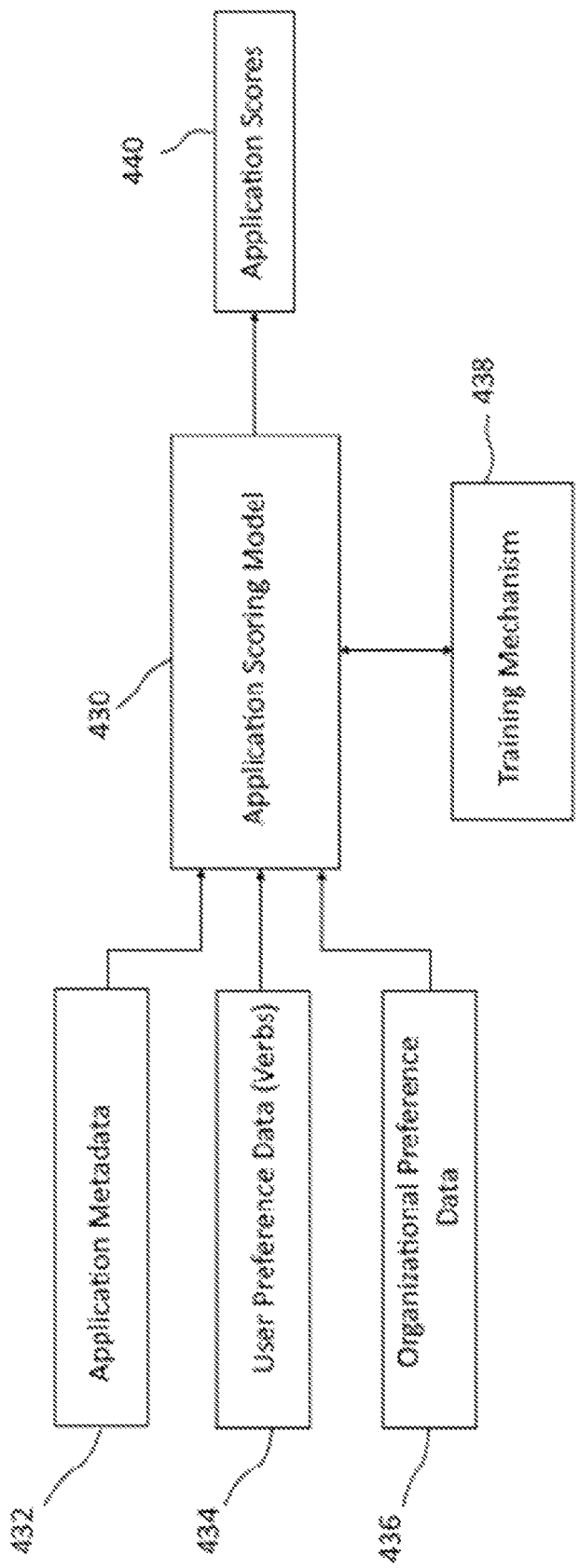
FIG. 4C shows an example of a application scoring model for scoring applications for the file opening system of FIG. 4B.

The application scoring component 416 may be configured to score the applications in any suitable manner. In embodiments, the application scoring component 416 may be configured to utilize a machine learning (ML) model to compute the score for each application. FIG. 4C depicts an example application scoring model 430 for scoring one or more software applications for opening a file on a user device. As depicted in FIG. 4C, the application scoring model 430 may be an ML model trained by training mechanism 438 to receive as input application metadata 432, user preference data 434 (including verbs), and the organizational preference data 436. The training mechanism 140 may use training data sets stored in a training data store to provide initial and ongoing training for each of the models. The training data sets may include sets of application metadata, user preference data, and organizational preference data. Different weights may be pre-assigned to different parameters of the training data. Desired and/or expected scores may be pre-assigned to applications during training. For example, inputs may be weighted such that default applications for a given file type are scored higher than other applications for opening that file type. Inputs may be weighted based on user preference data, such that applications that are likely to be preferred by a user are scored higher than other applications. Inputs may be weighted such that applications which are installed locally on the client device may be scored higher than other applications. In embodiments, inputs may be weighted such that applications based on organization preferences are scored higher in relation to other applications. The initial training may be performed in an offline stage. Additionally, and/or alternatively, the one or more ML models may be trained using batch learning. The training mechanism is configured to train the application scoring model to score applications based on the application metadata 432, user preference data 434 (including verbs), and the organizational preference data 436 to generate scores 440 for applications.

As a general matter, the methods and systems described herein may include, or otherwise make use of one or more ML model to perform scoring of software applications based on the application metadata, user preference data, and organizational preference data. The foundation of these algorithms is generally built on mathematics and statistics that can be employed to predict events, classify entities, diagnose problems, and model function approximations. As an example, a system can be trained using data generated by a ML model in order to identify patterns in user activities, determine associations between various images and users, and identify desired image characteristics. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

Once the list of applications has been scored, at least one application is then selected from the list by the application selection module 408 as the default application to open the file 418 on the user device 410 based on the application scores. For example, in one embodiment, the application having the highest score is selected to open the file for the user on the client device. In this embodiment, the selected application may then be included on the default application list 402 as the default application for opening files of that file type. In other embodiments, the system may be configured such that a predetermined number of the highest scored applications are selected as candidate applications for opening the file on the user device 410. The candidate applications may then each be used to open the file on the user device 410 and then a final selection of a default application for opening the file may be made. For example, candidate applications that are client applications may be downloaded and installed on the client device and launched with the file. Candidate applications that are web-based applications may be accessed by uploading the file to the web application, e.g., using a browser.

In some embodiments, the application selection module 408 may be configured to select the candidate application to use as the default application for the file based in part on application performance, e.g., success in loading the file, file load time, etc., of the candidate applications. In other embodiments, candidate applications may be presented to the user on the user device 410. The user may then select one of the candidate applications as the default application for opening the file via a user interface of the user device 410. In some embodiments, the file opened by the candidate applications may be the file 418. In other embodiments, the file opened by the candidate applications may be a sample file or the file contents of the original file 418 may be randomized to ensure that user data is not shared without the user's consent.

Figure 5:
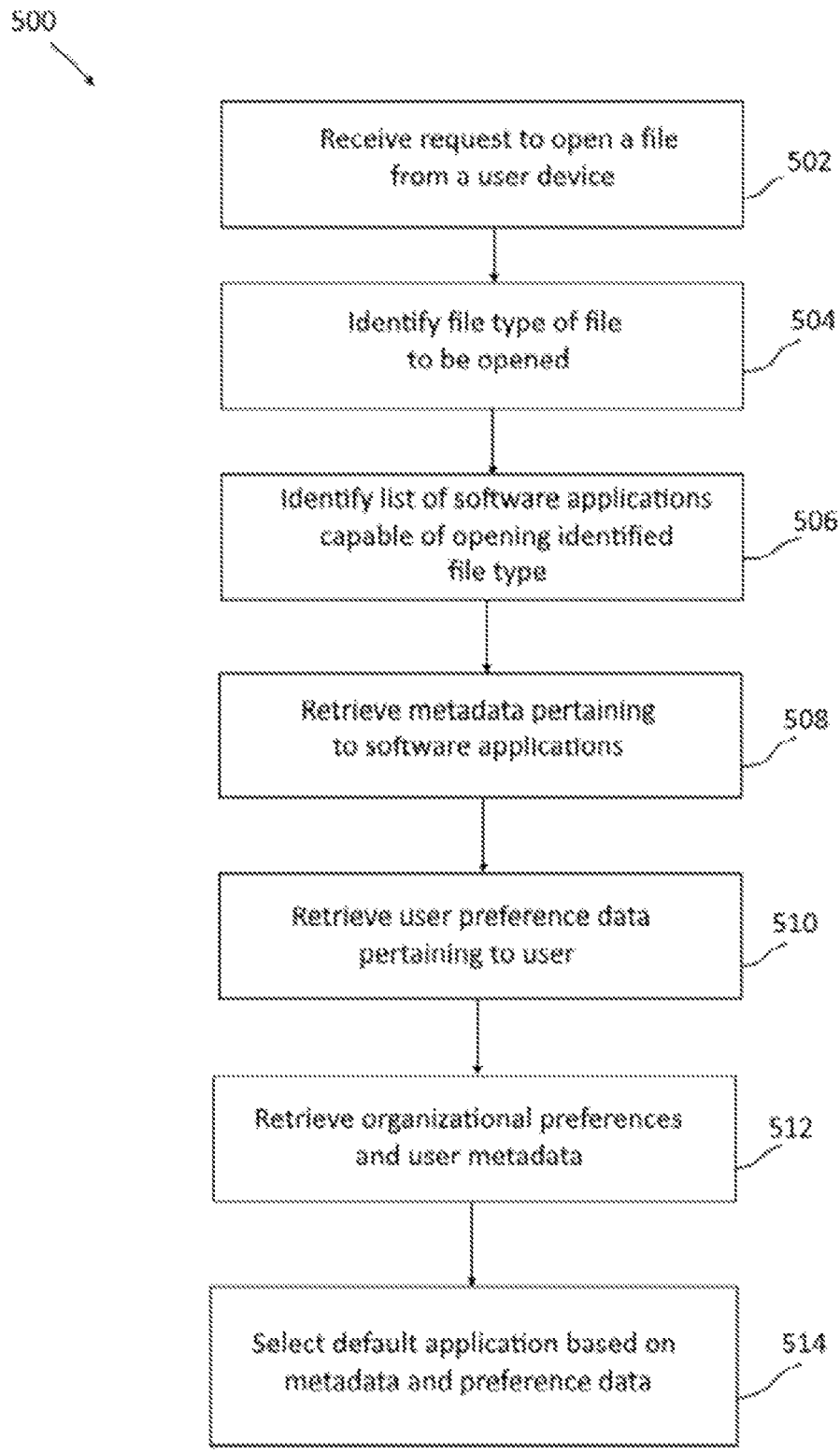
FIG. 5 is a flowchart of an example method for opening files on a user device using the file opening system according to this disclosure.

FIG. 5 is a flowchart of one example of a method 500 of opening a file using the file opening system in accordance with this disclosure. The method 500 begins with receiving a request to open a file from a user device (block 502). The file type pertaining to the file is identified (block 504). A list of software applications capable of opening the identified file type is then identified (block 506), e.g., by accessing an application database. Metadata pertaining to the identified software applications, such as average customer rating, popularity, customer usage data, and the like, is then retrieved (block 508). User preference data pertaining to the user requesting to open the file is also retrieved (block 510). Organizational preferences and user organization metadata is also retrieved (block 512). A default application for opening the file is then selected based on one or more of the metadata, user preference data, organizational preference data and user metadata (block 514). For example, the software applications may be scored using the scoring model 430 based one or more of metadata 432, user preference data 434, and organizational preference data 436, and the application having the highest score may then be selected as the default application for opening the identified file type.

Figure 6A:
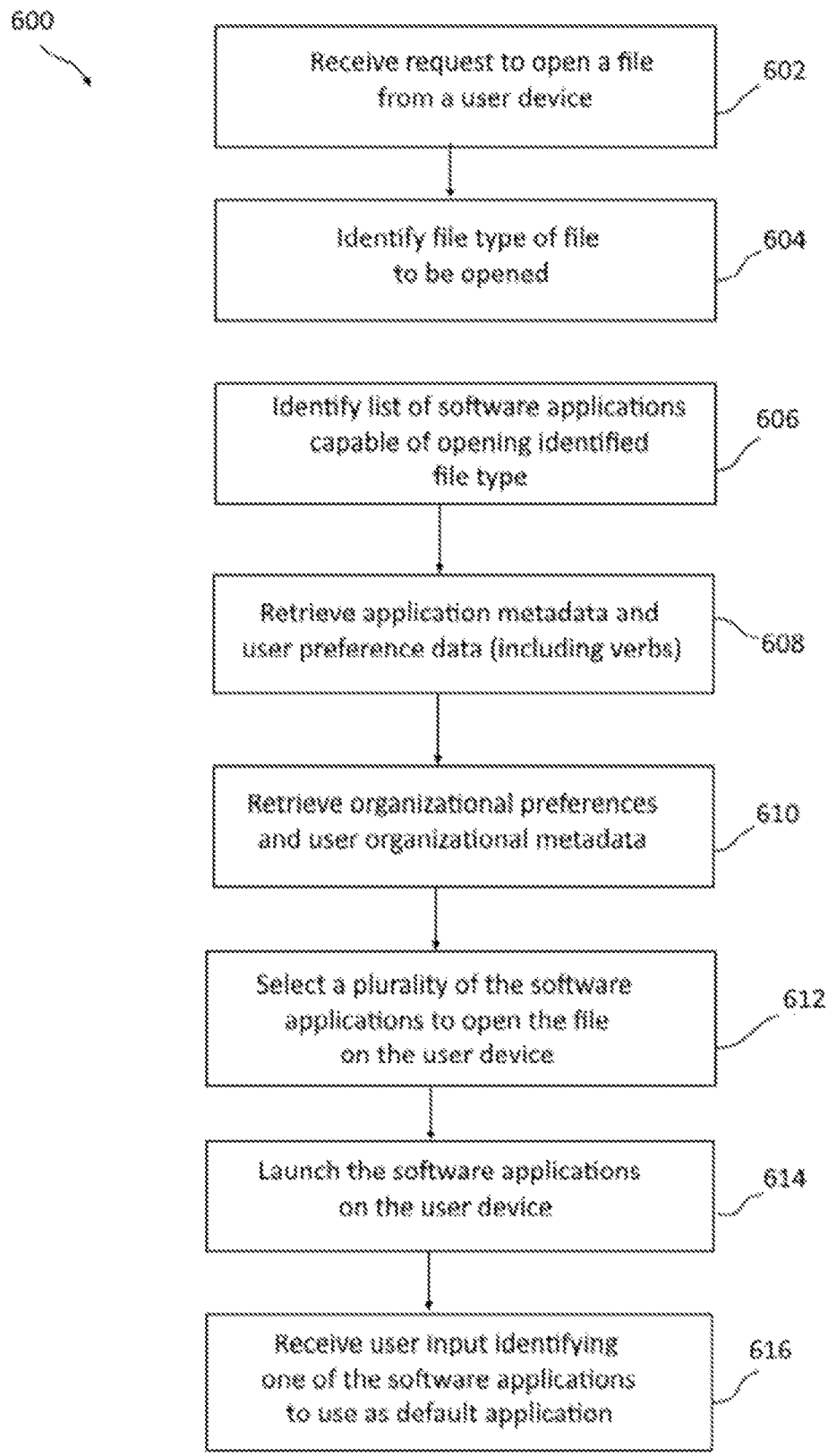
FIG. 6A is a flowchart of another example method for opening files on a user device using the file opening system according to this disclosure.

FIG. 6A is a flowchart of another example of a method 600 of opening a file using the file opening system in accordance with this disclosure. The method 600 begins with receiving a request to open a file from a user device (block 602). The file type pertaining to the file is identified (block 604). A list of software applications capable of opening the identified file type is then identified (block 606), e.g., by accessing an application database. Metadata pertaining to the identified software applications, such as average customer rating, popularity, customer usage data, and the like, as well as user preference data, including verbs, is then retrieved (block 608). Organizational preferences and user organizational metadata is also retrieved (block 610).

Rather than select a default application at this stage, the method 600 includes selecting a plurality of candidate software applications to open the file on the user device (block 612). The candidate applications are then launched on the user device (block 614). In embodiments, the candidate applications may be launched with the file that is requested to be opened, or, alternatively, with a sample file. User input is then received identifying one of the software applications to use as the default application for opening the identified file type (block 616). The identified software application may be included on the default application for the user device.

Figure 6B:
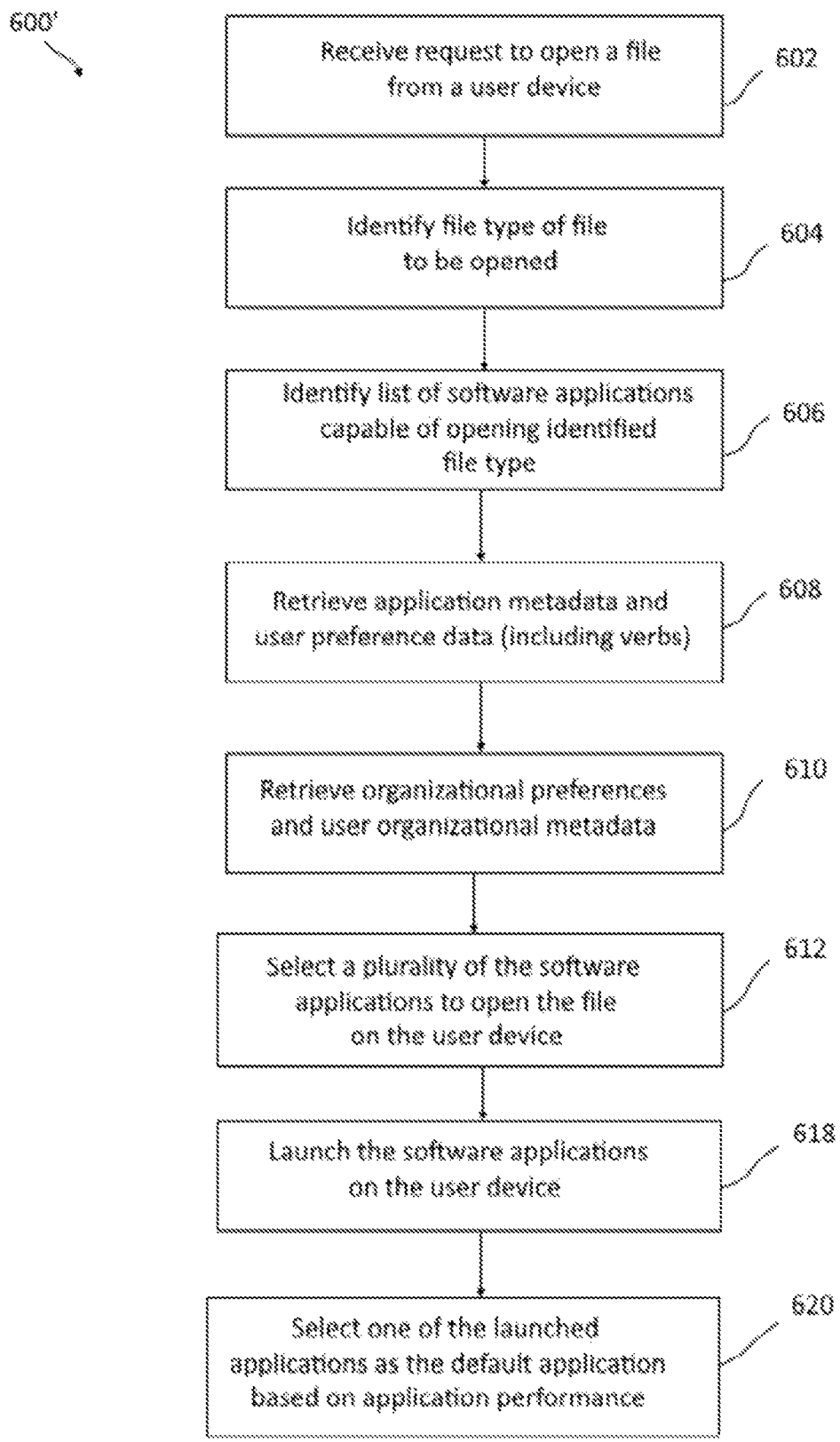
FIG. 6B is a flowchart of yet another example method for opening files on a user device using the file opening system according to this disclosure.

FIG. 6B is a flowchart of yet another example of a method 600' of opening a file using the file opening system in accordance with this disclosure. The method 600' begins with receiving a request to open a file from a user device (block 602). The file type pertaining to the file is identified (block 604). A list of software applications capable of opening the identified file type is then identified (block 606), e.g., by accessing an application database. Metadata pertaining to the identified software applications, such as average customer rating, popularity, customer usage data, and the like, as well as user preference data, including verbs, is then retrieved (block 608). Organizational preferences and user organizational metadata is also retrieved (block 610). Similar to the method 600 of FIG. 6, the method 600' includes selecting a plurality of candidate software applications to open the file on the user device (block 612). The candidate applications are then launched on the user device (block 618). In embodiments, the candidate applications may be launched with the file that is requested to be opened, or, alternatively, with a sample file. Rather than select a default application based on user input, the method 600' includes selecting one of the applications as the default application based on the performance of the launched applications (block 620). For example, the file opening system may be configured to select the application having the best performance opening the file, e.g., based on file load time, success opening the file, etc.

In embodiments, default applications set by a user may be given priority regarding application selection such that default applications are selected to open a file without going through the process of identifying candidate applications and/or scoring applications, as described above. However, in some cases, the file opening system 400 may be configured to provide the option to a user to identify possible alternatives to the default application to open files periodically or based on other factors, such as when new applications are discovered which may be more optimal for opening a file based on user and/or organizational preference information. For example, the system may be configured to offer to find alternatives to default applications on a predetermined schedule, e.g., once a month, once a year, or the like. In some embodiments, the file opening system may be configured to identify when new applications are added to the application database and to score the new applications based on metadata and preference data to determine whether they are viable alternatives to default applications. New applications identified as viable alternatives for default applications may then be presented to the user when the user attempts to open a file.

Figure 7:
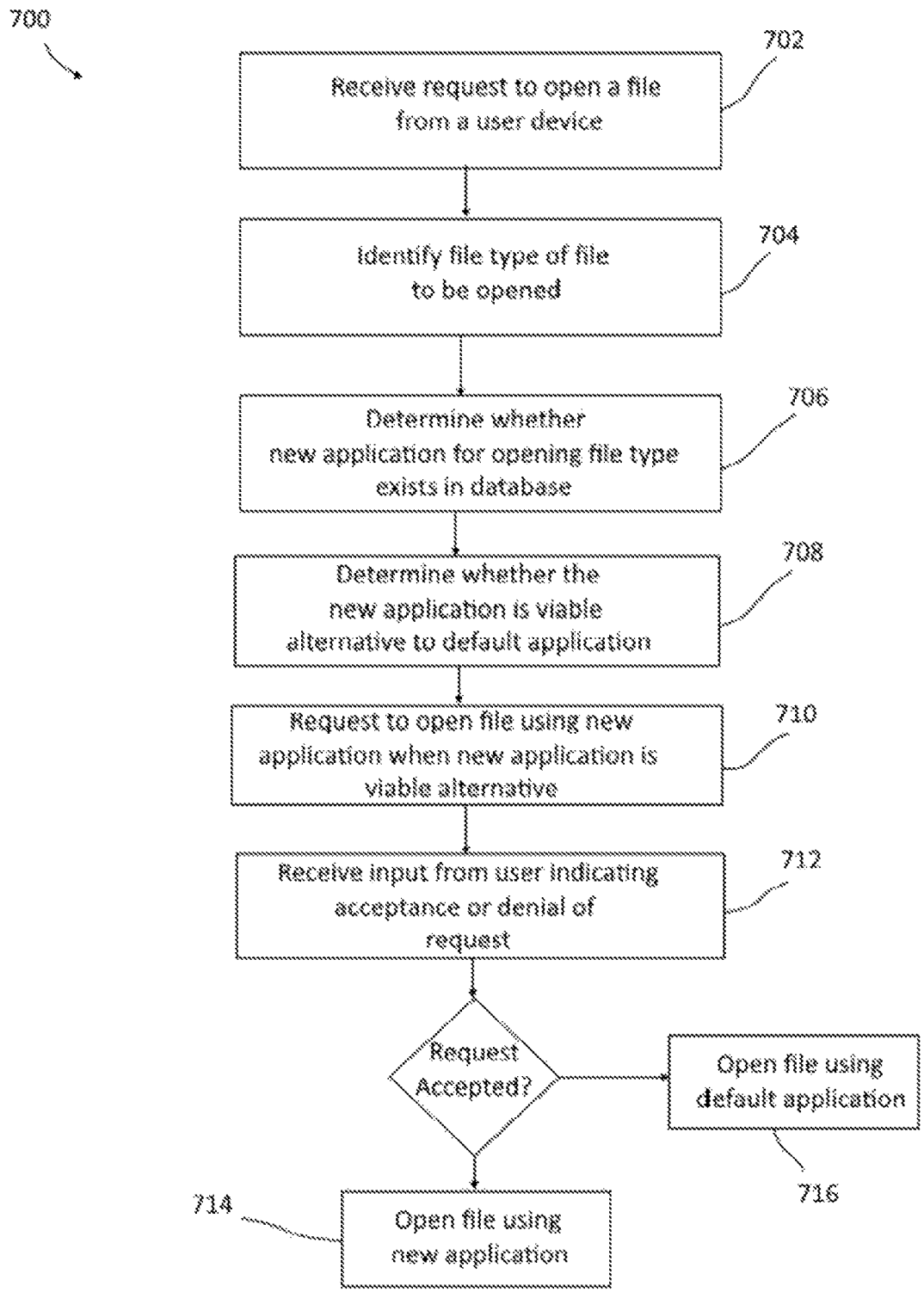
FIG. 7 is a flowchart of a method for identifying alternatives to default applications.

A method of identifying alternatives to default applications will now be described with reference to FIG. 7. The method 700 begins with receiving a request to open a file from a user device (block 702). The file type pertaining to the file is identified (block 704). A determination is then made as to whether a new application exists in the application database for opening the file type (block 706). If a new application does exist in the database for the file type, a determination is made as to whether the new application is a viable alternative to the default application for opening the file (block 708). For example, the application scoring model may score the new application based on application metadata, user preference data (including verb information), and organizational preference data. The score of the new application may then be compared to the default application to determine whether the new application is a viable alternative. If the new application is a viable alternative, the system may request to open the file using the new application (block 710). User input is then received indicating whether the request is accepted or denied (block 712). If the user accepts the request, the new application may then be utilized to open the file (block 714). For example, if the new application is a local application, the system may download the new application to the user device and then launch the application with the file. If the new application is a web application, the system may upload the file to the web application. If the request is denied, the default application is utilized to open the file (block 716).

Figure 8:
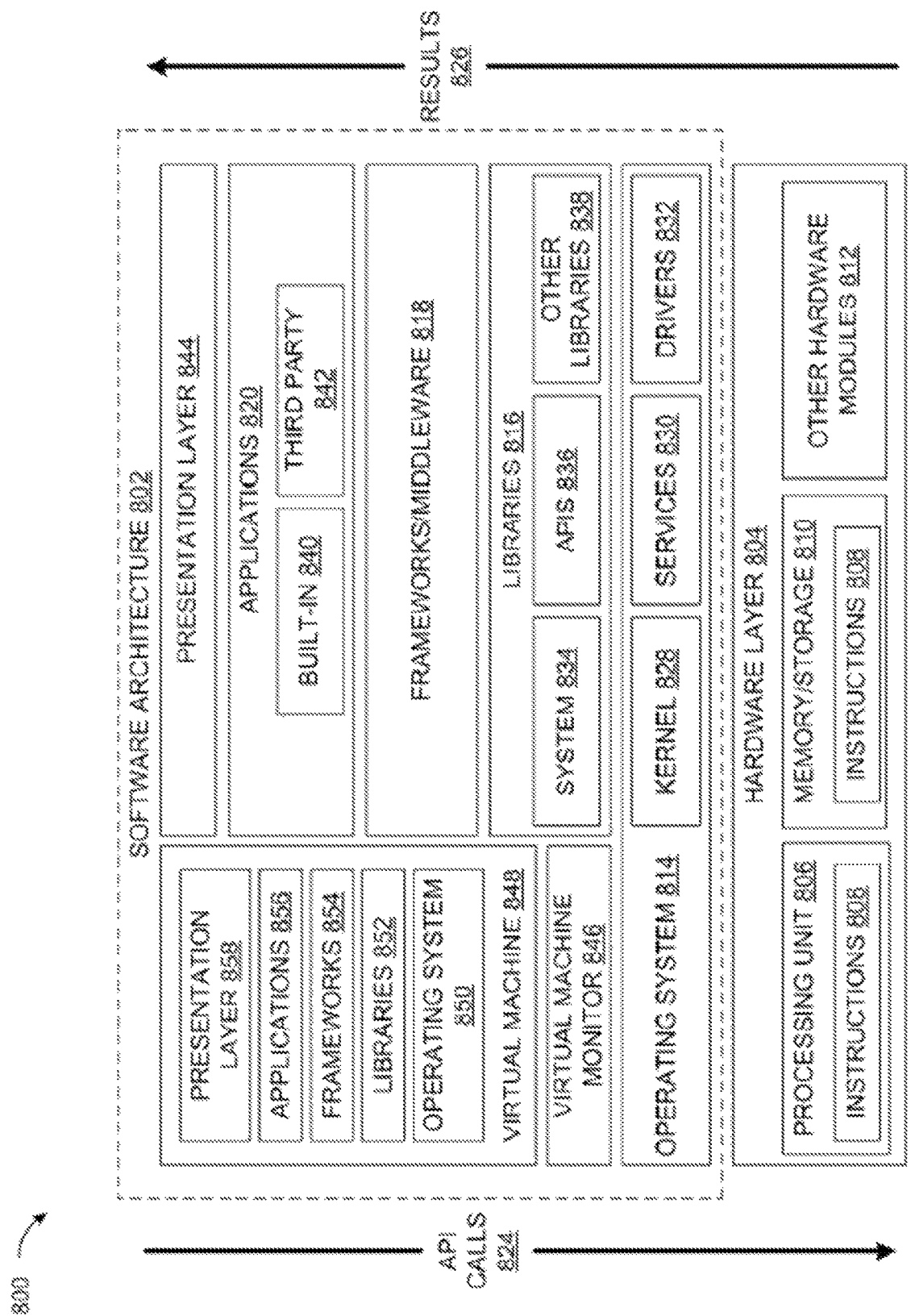
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
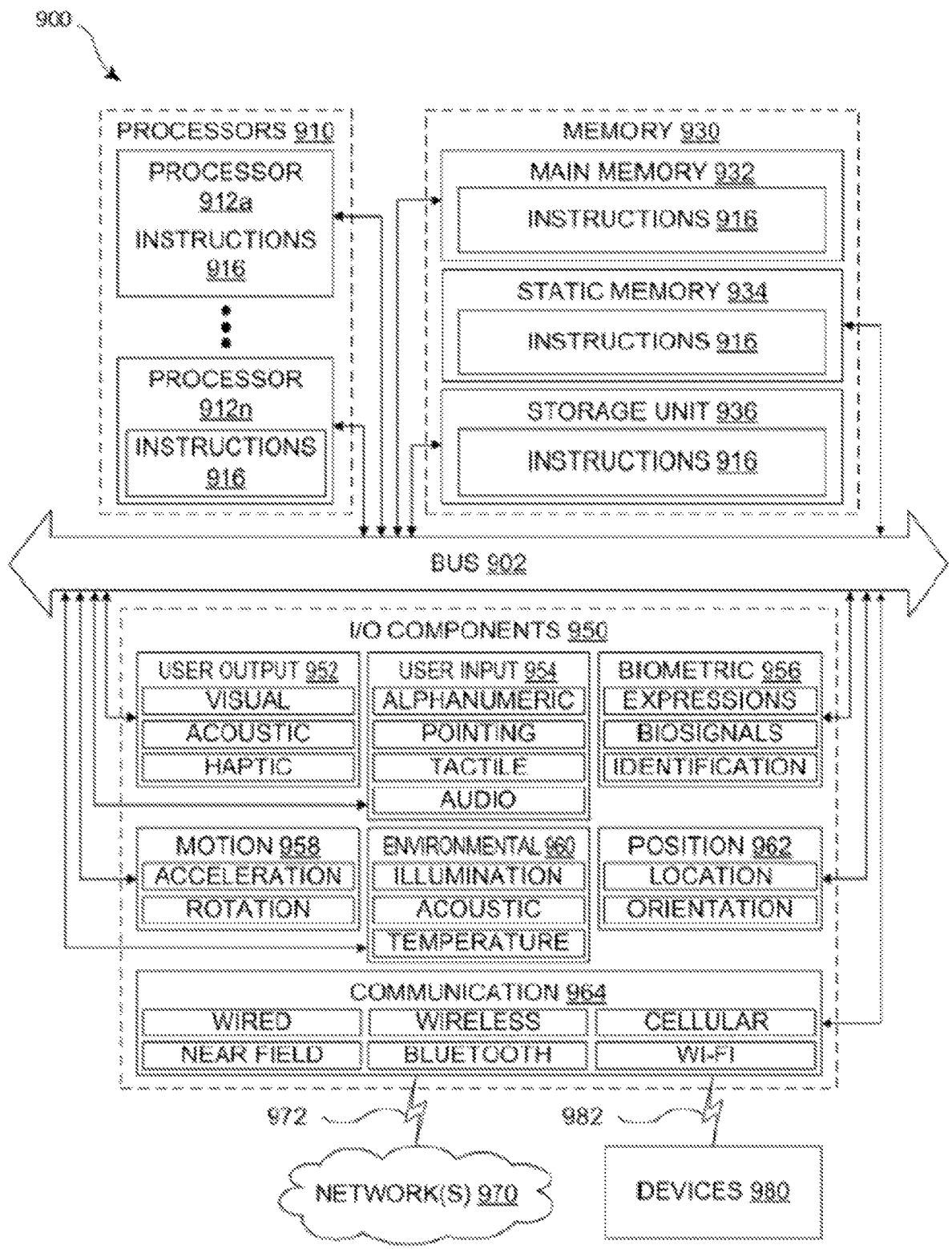
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

1. A data processing system comprising:
   a processor; and
   a memory in communication with the processor, the memory comprising executable instructions that, when executed by the processor, cause the data processing system to perform functions of:
   receiving a request to open a file on a user device;
   identifying a file type pertaining to the file;
   identifying a list of software applications capable of opening the identified file type;
   retrieving one or more of metadata pertaining to each of the software applications on the list, user preference data pertaining to a user requesting to open the file, and organizational preference data pertaining to at least one organization with which the user is affiliated;
   determining scores for the software applications on the list based on the one or more of the metadata, the user preference data, and the organizational preference data; and
   selecting at least one software application on the list to open the file on the user device based on the determined scores.

2. The data processing system of item 1, wherein the at least one selected software application includes a local software application configured to be installed and ran on the user device, and wherein the method further comprises:
   downloading and installing the local software application on the user device; and
   launching the local software application on the user device with the file.

3. The data processing system of any of items 1-2, wherein the at least one selected software application includes a web-based application, and wherein the method further comprises:
   uploading the file to the web-based application.

4. The data processing system of any of items 1-3, wherein selecting at least one application to open the file on the client device further comprises:
   selecting one of the software applications as a default application for opening files of the identified file type based on the determined scores.

5. The data processing system of any of items 1-4, wherein selecting at least one application to open the file on the client device further comprises:
   selecting a plurality of the software applications to open the file on the client device based on the determined score.

6. The data processing system of any of items 1-5, further comprising:
   launching the plurality of the software applications on the client device; and
   selecting one of the launched software applications as a default application for opening files of the file type.

7. The data processing system of any of items 1-6, wherein the organizational preference data includes user metadata indicating at least one of a position and geographic location of the user.

8. The data processing system any of items 1-7, wherein the user preference data includes verb information identifying at least one action that the user desires to perform with the file.

9. The data processing system of any of items 1-8, wherein the applications are scored using an application scoring model trained to use the metadata, the user preference, and the organizational preference data as inputs.

10. A method of opening a file on a client device, the method comprising:
    receiving a request to open a file on a user device;
    identifying a file type pertaining to the file;
    identifying a list of software applications capable of opening the identified file type;

retrieving one or more of metadata pertaining to each of the software applications on the list, user preference data pertaining to a user requesting to open the file, and organizational preference data pertaining to at least one organization the user is affiliated with;

determining scores for the software applications on the list based on the one or more of the metadata, the user preference data, and the organizational preference data; and selecting at least one software application on the list to open the file based on the determined scores.

11. The method of item 10, wherein the at least one selected software application includes a local software application configured to be installed and ran on the user device, and wherein the method further comprises:

downloading and installing the local software application on the user device; and launching the local software application on the user device with the file.

12. The method of any of items 10-11, wherein the at least one selected software application includes a web-based application, and wherein the method further comprises: uploading the file to the web-based application.

13. The method of any of items 10-12, wherein selecting at least one application to open the file on the client device further comprises:

selecting one of the software applications as a default application for opening files of the identified file type based on the determined scores.

14. The method of any of items 10-13, wherein selecting at least one application to open the file on the client device further comprises:

selecting a plurality of the software applications to open the file on the client device based on the determined score.

15. The method of any of items 10-14, further comprising:

launching the plurality of the software applications on the client device; and selecting one of the launched software applications as a default application for opening files of the file type.

16. The method of any of items 10-15, wherein the organizational preference data includes user metadata indicating at least one of a position and geographic location of the user.

17. The method of any of items 10-16, wherein the user preference data includes verb information identifying at least one action that the user desires to perform with the file.

18. The method of any of items 10-17, wherein the applications are scored using an application scoring model trained to use the metadata, the user preference, and the organizational preference data as inputs.

19. A non-transitory computer readable medium on which are stored instructions that, when executed, cause a programmable device to perform functions of:

receiving a request to open a file on a user device;

identifying a file type pertaining to the file;

identifying a list of software applications capable of opening the identified file type;

retrieving one or more of metadata pertaining to each of the software applications on the list, user preference data pertaining to a user requesting to open the file, and organizational preference data pertaining to at least one organization with which the user is affiliated;

determining scores for the software applications on the list based on the one or more of the metadata, the user preference data, and the organizational preference data; and selecting at least one software application on the list to open the file based on the determined scores.

20. The non-transitory computer readable medium of item 19, wherein the metadata includes rating data indicating an average customer rating for the application based on customer feedback.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
      receiving a request to open a file on a user device;
      identifying a file type pertaining to the file;
      identifying a list of software applications capable of opening the identified file type;
      retrieving one or more of metadata pertaining to each of the software applications on the list, user preference data pertaining to a user requesting to open the file, and organizational preference data pertaining to at least one organization with which the user is affiliated;
      determining scores for the software applications on the list based on the one or more of the metadata, the user preference data, and the organizational preference data;
      selecting a plurality of the software applications to open the file on the user device based on the determined scores;
      launching the plurality of the software applications on the user device to open the file or a separate sample file; and
      after the plurality of software applications have been launched and opened the file or the separate sample file, designating one of the launched software applications as a default application for opening files of the file type.

2. The data processing system of claim 1, wherein the plurality of software applications selected to open the file include a local software application configured to be installed and ran on the user device, and wherein the functions further comprise:
   downloading and installing the local software application on the user device; and
   launching the local software application on the user device with the file.

3. The data processing system of claim 1, wherein the plurality of software applications selected to open the file include a web-based application, and wherein the functions further comprise:
   uploading the file to the web-based application.

4. The data processing system of claim 1, wherein the plurality of software applications is selected based on the determined scores.

5. The data processing system of claim 1, wherein the organizational preference data includes user metadata indicating at least one of a position and geographic location of the user.

6. The data processing system of claim 1, wherein the user preference data includes verb information identifying at least one action that the user desires to perform with the file.

7. The data processing system of claim 1, wherein the software applications are scored using an application scoring model trained to use the metadata, the user preference data, and the organizational preference data as inputs.

8. A method of opening a file on a user device, the method comprising:
   receiving a request to open a file on a user device;
   identifying a file type pertaining to the file;
   identifying a list of software applications capable of opening the identified file type;
   retrieving one or more of metadata pertaining to each of the software applications on the list, user preference data pertaining to a user requesting to open the file, and organizational preference data pertaining to at least one organization the user is affiliated with;
   determining scores for the software applications on the list based on the one or more of the metadata, the user preference data, and the organizational preference data;
   selecting a plurality of the software applications to open the file on the user device based on the determined scores;
   launching the plurality of the software applications on the user device to open the file or a separate sample file; and
   after the plurality of software applications have been launched and opened the file or the separate sample file, designating one of the launched software applications as a default application for opening files of the file type.

9. The method of claim 8, wherein the plurality of software applications includes a local software application configured to be installed and ran on the user device, and wherein the method further comprises:
   downloading and installing the local software application on the user device; and
   launching the local software application on the user device with the file.

10. The method of claim 8, wherein the plurality of software applications selected to open the file include a web-based application, and wherein the method further comprises:
    uploading the file to the web-based application.

11. The method of claim 8, wherein the plurality of software applications is selected based on the determined scores.

12. The method of claim 8, wherein the organizational preference data includes user metadata indicating at least one of a position and geographic location of the user.

13. The method of claim 8, wherein the user preference data includes verb information identifying at least one action that the user desires to perform with the file.

14. The method of claim 8, wherein the software applications are scored using an application scoring model trained to use the metadata, the user preference data, and the organizational preference data as inputs.

15. A non-transitory computer readable medium on which are stored instructions that, when executed, cause a programmable device to perform functions of:

receiving a request to open a file on a user device;

identifying a file type pertaining to the file;

identifying a list of software applications capable of opening the identified file type;

retrieving one or more of metadata pertaining to each of the software applications on the list, user preference data pertaining to a user requesting to open the file, and organizational preference data pertaining to at least one organization with which the user is affiliated;

determining scores for the software applications on the list based on the one or more of the metadata, the user preference data, and the organizational preference data;

selecting a plurality of the software applications to open the file on the user device based on the determined scores, launching the plurality of the software applications on the user device to open the file or a separate sample file; and after the plurality of software applications have been launched and opened the file or the separate sample file, designating one of the launched software applications as a default application for opening files of the file type.

16. The non-transitory computer readable medium of claim 15, wherein the metadata includes rating data indicating an average customer rating for an application based on customer feedback.

* * * * *